United States Patent [19]
Yamabuchi

[11] Patent Number: 5,751,407
[45] Date of Patent: May 12, 1998

[54] OPTICAL RADAR DEVICE

[75] Inventor: Hiroshi Yamabuchi, Tokyo, Japan

[73] Assignee: Mitsubishi Denki Kabushiki Kaisha, Tokyo, Japan

[21] Appl. No.: 678,056

[22] Filed: Jul. 9, 1996

[30] Foreign Application Priority Data

Mar. 25, 1996 [JP] Japan .................. 8-068644

[51] Int. Cl.⁶ .................................................. G01C 3/00
[52] U.S. Cl. .................. 356/3.05; 356/3.09; 356/4.01
[58] Field of Search .................... 356/3.05, 3.09, 356/4.01, 5.01

[56] References Cited

U.S. PATENT DOCUMENTS

| | | | |
|---|---|---|---|
| 5,493,388 | 2/1996 | Adachi | 356/5.01 |
| 5,515,156 | 5/1996 | Yoshida et al. | 356/5.01 |
| 5,648,852 | 7/1997 | Kato et al. | 356/375 |
| 5,661,551 | 8/1997 | Yamabuch | 356/5.01 |

FOREIGN PATENT DOCUMENTS 6-137867  5/1994  Japan .................. G01C 3/06

*Primary Examiner*—Mark Hellner
*Attorney, Agent, or Firm*—Sughrue, Mion, Zinn, Macpeak & Seas, PLLC

[57] ABSTRACT

An optical radar device has a vertical deflecting device which deflects an optical beam so as to emit the optical beam horizontally in a first half of reciprocal scanning in a horizontal direction and a part thereof upwards by a predetermined angle in a second half thereof. Thus, the optical radar device can detect both objects each with a reflecting portion installed at a low position such as a car and at a high position such as a truck.

5 Claims, 6 Drawing Sheets

OPTICAL RADAR DEVICE

BACKGROUND OF THE INVENTION

1. Field of the Invention

The present invention relates to an optical radar which scans an optical beam in a horizontal direction and receives the optical beam reflected and returned from an object to detect the distance to the object and its direction.

2. Description of the Prior Art

An optical radar has been used as a monitor, loaded in a vehicle, for monitoring the environment of the vehicle, or a device for controlling the distance between the two cars going in the same direction.

The conventional optical radar, as disclosed in e.g. JP-A-6-137867, is structured to scan the optical beam in a horizontal direction to detect an object in a wide range. The each stretch angle of the optical beam in a vertical direction is about 2° with respect to the horizontal plane. Namely, the optical beam is vertically spread about 4° in total.

Since the optical radar loaded in a vehicle is generally installed at a position of 40 cm or so above ground, the height of the object above ground which can be detected by the optical beam having an elevation angle of 2° is 75 cm at a position of 10 m ahead and 57 cm at a position of 5 m ahead, respectively. When the vehicle to be detected is a medium-scale truck with no reflecting plate at a rear low position or an all-terrain vehicle with a reflector installed at a comparatively high position, an optical beam may scan the space in the lower part of a vehicle body to be detected or the chassis or bumper with a low reflective coefficient at the lower part of the vehicle. In such case, the amount of light necessary to detect the vehicle cannot be obtained. Thus, as the case may be, the vehicle object could not be detected. In order to explain the above problem, FIG. 6 shows an example in that an optical radar is installed at a position of 40 cm in height and a reflector is installed at a position of 100 cm.

SUMMARY OF THE INVENTION

An object of the present invention is to provide an optical radar device which can detect surely an object vehicle at a relatively short distance.

In accordance with the present invention, there is provided an optical radar in which an optical beam is scanned horizontally on an object and the beam reflected from the object is received to detect the distance to the object, comprising a vertical deflecting means for vertically deflecting the optical beam by a predetermined angle only during a predetermined time of a scanning period.

In the optical radar device, the optical beam is reciprocative scanned horizontally with one scanning period shorter than the other scanning period, and the vertical deflecting means deflects the optical beam during the shorter scanning period vertically by a predetermined angle.

In the optical radar device, the vertical deflecting means comprises a cylindrical mirror having an axis orthogonal to the optical axis of the optical beam and a driving mechanism for shifting the cylindrical mirror to first and second vertical positions.

In the optical radar device, the vertical direction deflecting means comprises a wedge-shaped prism having an axis orthogonal to the optical axis of said optical beam and a driving mechanism for shifting the wedge-shaped prism to first and second vertical position.

In accordance with the present invention, since the vertical deflecting means is provided which serves to deflect a horizontally scanned optical beam upward by a predetermined angle during a predetermined period, the object with an reflecting portion installed at a high position can be detected.

Since the optical beam is deflected vertically during a short horizontal scanning period, the object at a high position can be detected without hindering detection of the object at a low position.

Since the optical beam can be spread upwards in such a manner that a part of the optical beam is reflected by the cylindrical mirror, the object with a reflecting portion installed at a high position can be detected. In this case, the strength of a portion spread upwards of the optical beam is reduced so that the likelihood of detecting the object with high reflectance far in the distance can be reduced.

Further, since the optical beam can be vertically deflected by a predetermined angle through a wedge-shaped prism without increasing the vertical spread of the optical beam, the object with the reflecting potion installed at a high position can be detected.

DESCRIPTION OF THE PREFERRED EMBODIMENTS

Embodiment 1

Figure 1:
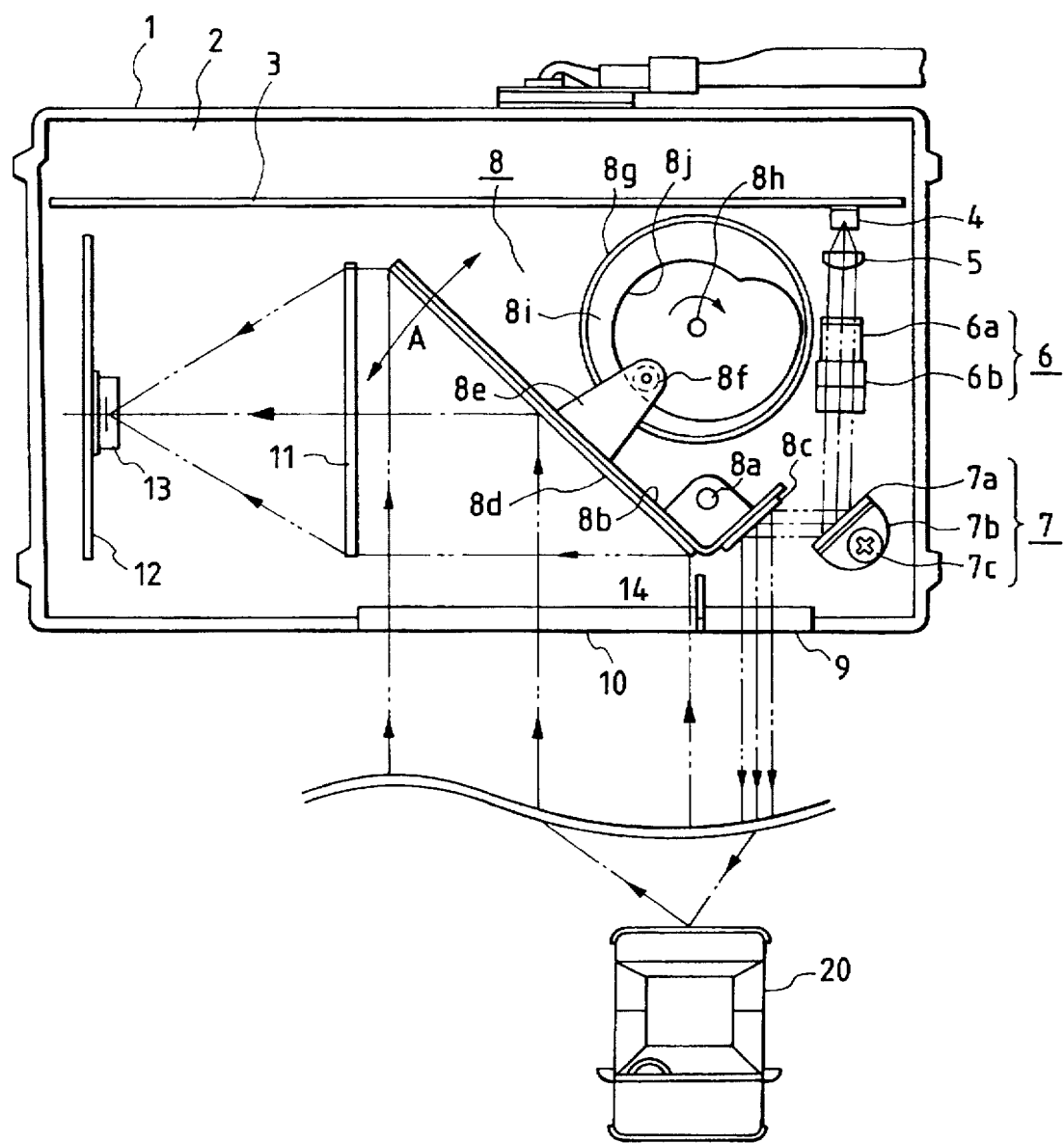
FIG. 1 is a plan view showing the internal structure of an optical radar device according to the first embodiment of the present invention with an upper cover removed.
Figure 2:
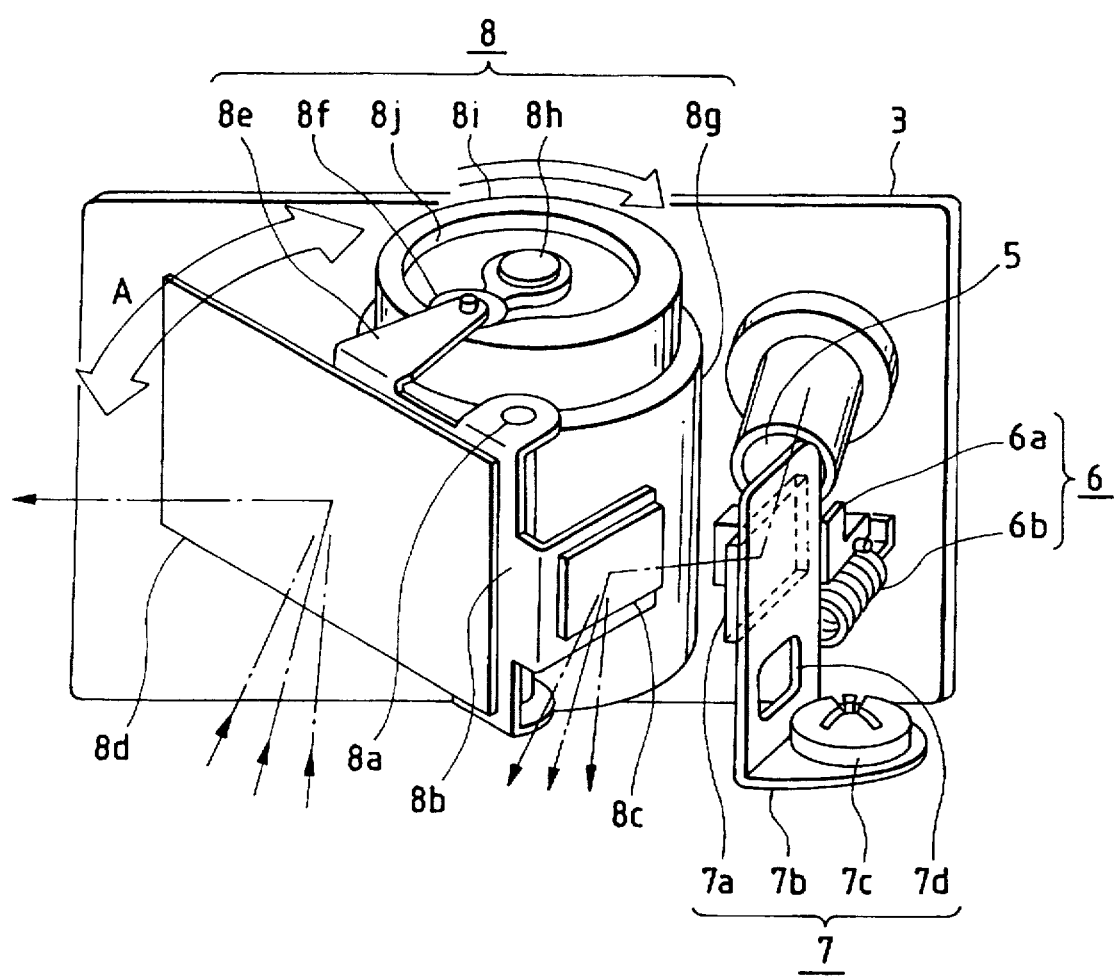
FIG. 2 is a perspective view showing the structures of a vertical deflecting means and a horizontal scanning means.

FIG. 1 is a plan view showing the internal structure of an optical radar device according to the first embodiment of the present invention with an upper cover removed. FIG. 2 is a perspective view showing the structures of a vertical deflecting means and a horizontal scanning means. In these figures, reference numeral 1 denotes an enclosure; 2 a base stand; 3 a main base plate; and 4 a laser diode. On the base plate 3 are mounted the laser diode 4, a laser diode driving circuit, means for driving the deflecting means (not shown), a distance calculating circuit (not shown), direction detection circuit (not shown), stepping motor driving circuit (not shown), etc. Reference numeral 5 denotes an optical beam shaping lens which serves to shape the laser beam emitted from the laser diode 4 into an optical beam having spread angles of about 0.1° in a horizontal direction and about 40° in a vertical direction.

Reference numeral 6 denotes a vertical deflecting means which includes an optical axis deflecting member 6a and an electromagnet 6b. The vertical deflecting means 6 deflects the optical axis emitted from the optical radar means so that its first half in the horizontal scanning is in a horizontal direction and the second half of the horizontal scanning is in about 6° upward from the horizontal direction.

Reference numeral 7 denotes an optical axis adjusting means which includes a reflecting mirror 7a, a supporting member 7b for supporting it and attachment screw 7c. The supporting member 7b includes a hollow portion 7d to deform the leg portions on its both sides which permits the optical axis of the optical beam emitted from the reflecting mirror 7a to be easily trimmed.

Reference numeral 8 denotes a horizontal scanning means. The horizontal scanning means 8 includes an L-shaped rotary member 8b supported rotatably around a supporting shaft 8a implanted on a base stand; a first reflecting mirror 8c held on the one face of the rotary member 8b and a second reflecting mirror 8d held on another face thereof; an arm Be provided on the rotary member 8b and a follower 8f attached to its tip; a stepping motor 8g attached to the base stand 2; a cam attached around a rotary shaft 8h of the stepping motor; and pressing means (not shown) which serves to press the follower 8f on the modified heart-shaped cam face 8j of the cam 8i. while the rotary shaft Bh of the stepping motor 8g rotates once, the L-shaped member 8b repeats a swing operation that it swings at a low constant speed in the first half (outward path) and a high speed in the second half (return path) in a range of arrow A. Thus, the optical beam which is incident to the first reflecting mirror 8c from the optical axis adjusting means 7 and reflected therefrom scans reciprocally in a predetermined range of angle in a horizontal direction through a glass window 9. The optical beam from the object 20 such as a preceding vehicle is received by the second reflecting mirror Bd through a glass window 10. The optical beam reflected from the reflecting mirror 8d is focused by a Fresnel lens 11. The focused optical beam is incident on an optical diode 13 attached to a subsidiary base plate 12. The optical diode 13 serves to convert the optical beam into an electric signal. The electric signal is supplied to a distance operating circuit and a direction detection circuit. Reference numeral 14 denotes a shading member for preventing the optical beam from being interfered with reflected light.

Figure 3A:
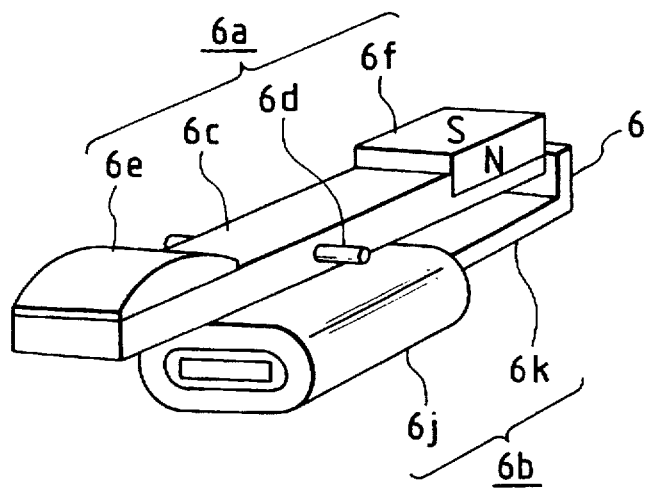
FIGS. 3A–3C are side views showing the vertical deflecting means according to the first embodiment and its operation manner.
Figure 3B:
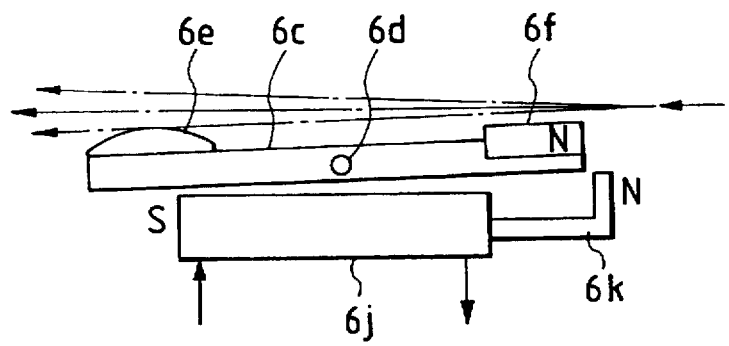

FIG. 3A is a perspective view of the vertical deflecting means 6 according to the first embodiment. In this figure, reference numeral 6c denotes a swing member supported by a supporting shaft 6d; 6e a cylindrical mirror attached at one end of the upper surface of the swing member 6c, the axis of the cylindrical mirror being arranged in a direction orthogonal to the swinging face of the swing member. Reference numeral 6f denotes a permanent magnet attached at the other end of the swing member 6c and magnetized with an S-polarity on the upper face and an N-polarity on the lower face. The members 6e to 6f constitute an optical axis deflecting member 6a. Reference numeral 6j denotes an electromagnetic coil and 6k denotes a magnetic core. The electromagnetic coil 6j and the magnetic core 6k constitute an electromagnet 6b which drives the swing member 6c vertically. By exchanging the conducting sense of the current flowing through the electromagnetic coil 6j, the first half of scanning of the optical beam is changed into a state where the cylindrical mirror 6e is outside the optical path of the optical beam as shown in FIG. 3B, and the second half is changed into a state where the cylindrical mirror 6e is within the optical beam as shown in FIG. 3C.

Figure 3C:
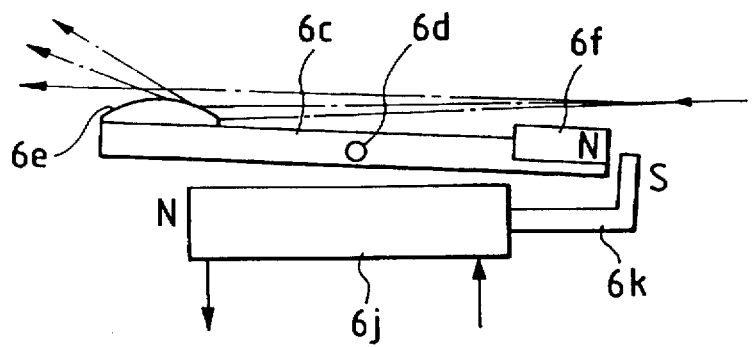

In the state of FIG. 3C, a part of the optical beam having a vertical spread of 4° is reflected from the cylindrical mirror 6e and is emitted in the upward direction of 6° in maximum.

As a result, the optical beam is emitted to have a vertical spread of e.g. 0°–60° from the optical axis.

Figure 4:
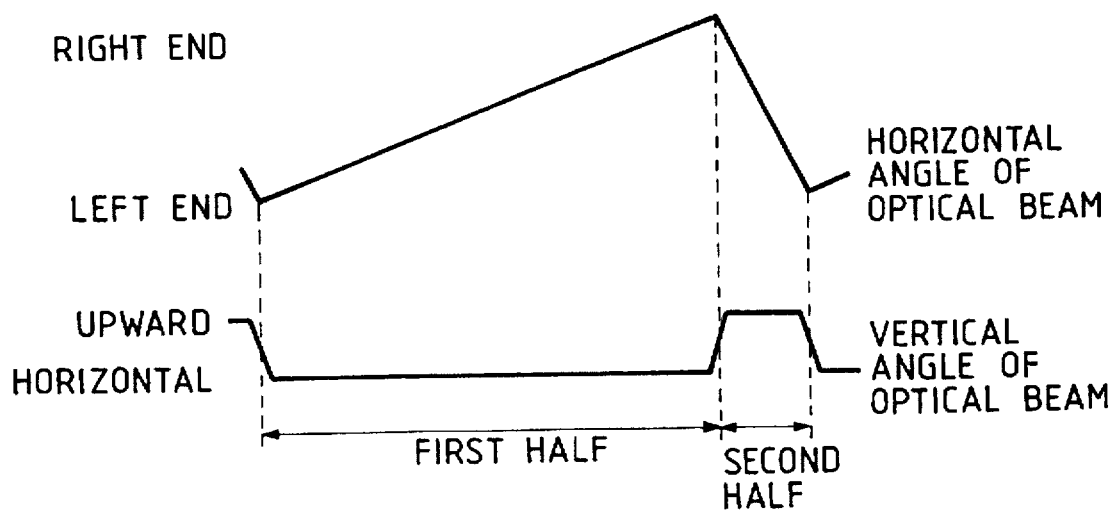
FIG. 4 is a view showing a relationship between the horizontal scanning angle and the vertical angle of an optical beam according to the present invention.
Figure 7A:
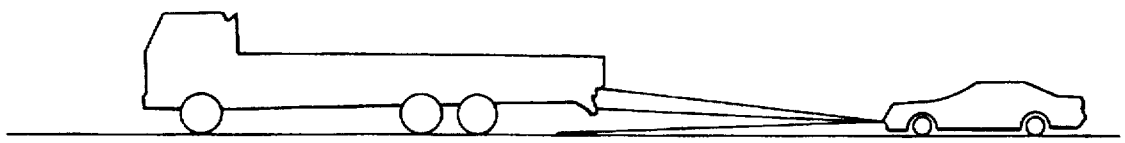
FIGS. 7A and 7B show an example of the present invention.
Figure 7B:
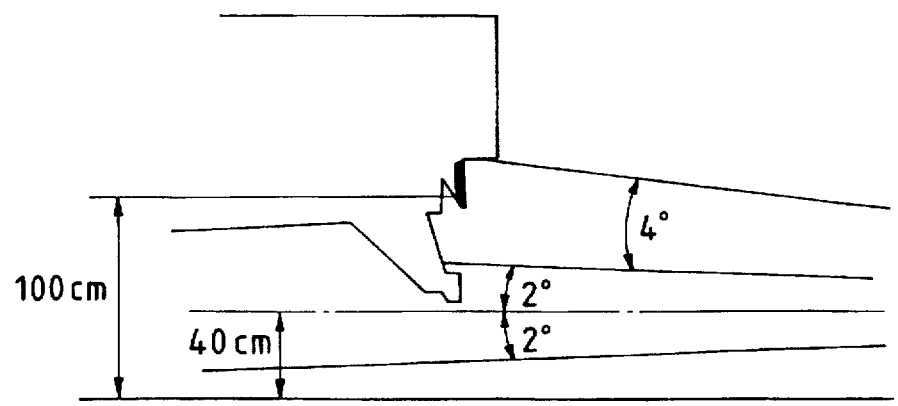

FIG. 4 is a graph showing the relationship between the horizontal scanning angle of the optical beam and the vertical angle of the optical beam. In the first embodiment, the vertical direction deflecting means 6 is so controlled that in the first half in the scanning, the optical beam is emitted horizontally and in the second half it is emitted to have a vertical spread of 0°–6°. FIGS. 7A and 7B shows an example of the present invention in that the heights of the object which can be detected are heightened to 140 cm at a position of 10 m ahead and 92 cm at a position of 5 m ahead, respectively.

In the optical radar device according to the first embodiment, the supporting member 7b of the optical axis adjusting means 7 is screwed on the base stand 2 by an attaching screw 7c, and the supporting member 7b is deformed to adjust the optical axis minutely. In this case, since the supporting member 7b has a hollow portion 7d, the supporting member 7b can be easily deformed to permit minute adjustment. In addition, since the reflecting mirror 7a is supported by the leg portions on both sides of the hollow portion 7d, the reflecting mirror 7a can be supported with sufficient rigidity.

Further, since the vertical direction deflecting means 6 can shift the cylindrical mirror 6e upward only in the second half of scanning so that the vertical spread of the optical beam is increased upwards, the object with a reflecting portion installed at a high position can be surely detected. In addition, the strength of the portion spread upwards of the optical beam becomes so low that the object with high reflectance located far in the distance can be detected with little likelihood.

Incidentally, in the above embodiment, the optical beam is emitted horizontally in the first half of the scanning and the vertical angle of the optical beam can be spread upwards in the second half. The first half and second half may be replaced by each other, and the speed of scanning in the first half and second half may be made equal. Further, the reciprocating scanning may be effected while changing the vertical spread angle of the optical beam.

Embodiment 2

Figure 5A:
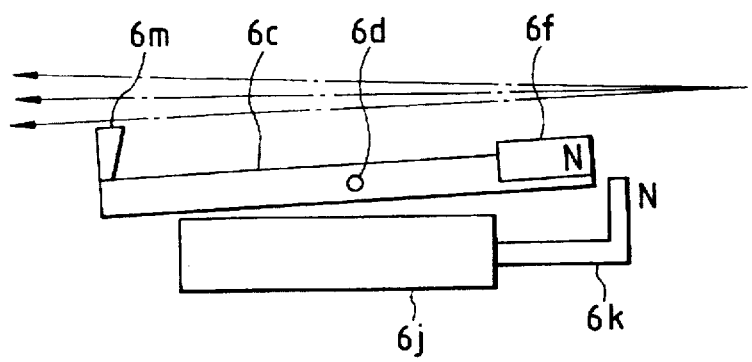
FIGS. 5A and 5B are side views of the vertical deflecting means according to the second embodiment and its operating manner.
Figure 5B:
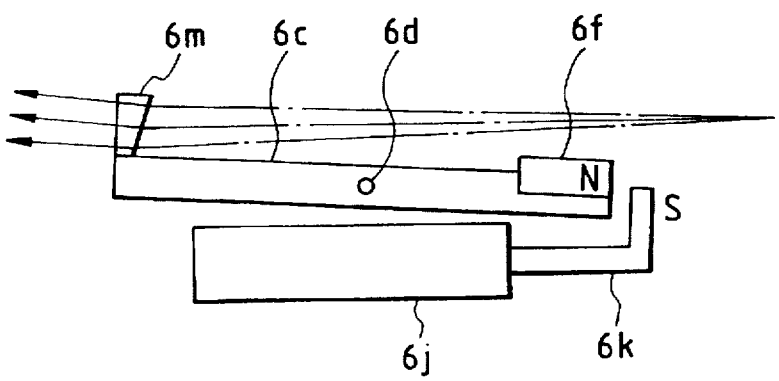
Figure 6A:
FIGS. 6A and 6B show an example in that an optical radar is installed at a position of 40 cm in height and a reflector is installed at a position of 100 cm.
Figure 6B:
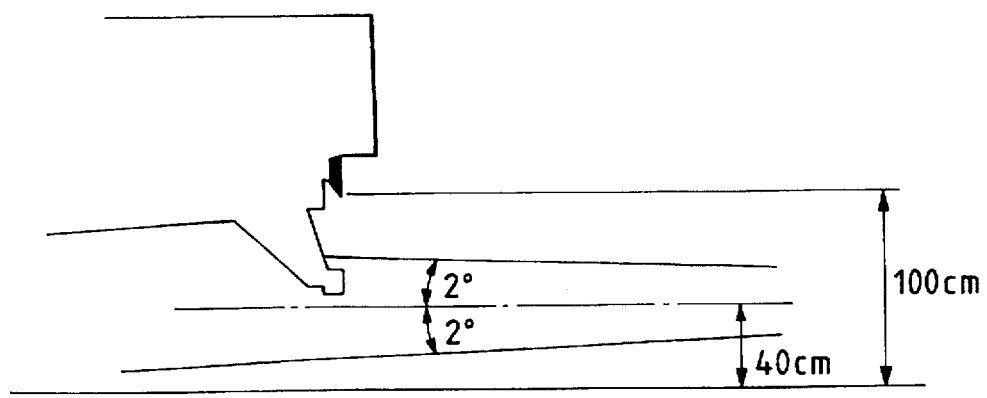

FIGS. 5A and 5B are side views of the vertical deflecting means according to the second embodiment and its operating manner. In FIGS. 5A and 5B, like reference numerals refer to like or corresponding parts in FIGS. 3A to 3C. In FIGS. 5A and 5B, reference numeral 6 m denotes a wedge-shaped prism having an apex angle of about 6° whose axis is orthogonal to the optical axis of the optical beam and whose thinner portion is attached to the one end of the swing member 6c.

This vertical deflecting means 6 is driven in the same manner as that shown in FIG. 3. In FIG. 5A, when the wedge-shaped prism is located outside the optical path of the optical beam, the optical beam does not permeate through the prism so that it is emitted with a vertical spread of 4°. On the other hand, as shown in FIG. 5B, when the wedge-shaped prism is located within the optical path of the optical beam, the optical beam is emitted to be refracted in an upward direction of about 6° with the vertical spread of 4° as it is. Thus, unlike the case where a cylindrical mirror is used, the optical beam is not spread so that the object with a reflecting portion installed at a high position can be easily detected.

In both first and second embodiments, the vertical deflection means may be located upside down so that it deflects the optical beam downwards. This permits the object located at a high position to be detected by the optical beam travelling in the straight line and the object located at a low position to be detected by the deflected optical beam.

What is claimed is:

1. An optical radar device comprising:

light emitting means for producing an optical beam;

scanning, means for scanning the optical beam on an object to be detected in a horizontal direction;

light receiving means for receiving a reflection light from the object;

calculation means for calculating a distance to the object in accordance with tile reflection light detected by the light receiving means: and vertical deflecting means for vertically deflecting said optical beam by a predetermined angle only during a predetermined time of a scanning period wherein:

said vertical deflecting means comprises:
- a cylindrical mirror having an axis orthogonal to the optical axis of the optical beam, and
- a driving mechanism for shifting the cylindrical mirror to first and second vertical positions;

when said cylindrical mirror is located at the first position said cylindrical mirror is located outside an optical path of the optical beam; and when said cylindrical mirror is located at the second position said cylindrical mirror is located within the optical path of the optical beam so as to reflect a part of the optical beam in a predetermined direction.

2. An optical radar device comprising:

light emitting means for producing an optical beam:

scanning means for scanning the optical beam on an object to be detected in a horizontal direction:

light receiving means for receiving a reflection light from the object;

calculation means for calculating a distance to the object in accordance with the reflection light detected by the light receiving means, and vertical deflecting means for vertically deflecting said optical beam by a predetermined angle only during a predetermined time of a scanning period wherein:

said vertical deflecting means comprises;
- a wedge-shaped prism having, an axis orthogonal to the optical axis of said optical beam, and
- a driving mechanism for shifting the wedge-shaped prism to first and second vertical positions;

when said wedge-shaped prism is located at the first position, said wedge-shaped prism is located outside an optical path of the optical beam; and when said wedge-shaped prism is located at the second position said wedge-shaped prism is located within the optical path of the optical beam so as to refract the incident optical beam in a predetermined direction.

3. An optical radar device comprising:

light emitting means for producing an optical beam;

scanning means for scanning tile optical beam on all object to be detected in a horizontal direction:

light receiving means for receiving a reflection light from the object;

calculation means for calculating a distance to the object in accordance with the reflection light detected by the light receiving means: and vertical deflecting means for vertically deflecting said optical beam by a predetermined angle only during, a predetermined time of a scanning period wherein:

said optical beam is scanned reciprocatively and horizontally with one scanning period shorter than the other scanning period, and said vertical deflecting means vertically deflects the optical beam upwardly, during the shorter scanning period, by a predetermined angle.

4. An optical radar device according to claim 3, wherein:

said vertical deflecting means comprises;
- a cylindrical mirror having, an axis orthogonal to the optical axis of the optical beam; and
- a driving mechanism for shifting the cylindrical mirror to first and second vertical positions;

when said cylindrical mirror is located at the first position, said cylindrical mirror is located outside an optical path of the optical beam: and when said cylindrical mirror is located at the second position, said cylindrical mirror is located within the optical path of the optical beam so as to reflect a part of the optical beam in a predetermined direction.

5. An optical radar device according to claim 3 wherein;

said vertical deflecting means comprises:
- a wedge-shaped prism having an axis orthogonal to the optical axis of said optical beam, and
- a driving, mechanism for shifting the wedge-shaped prism to first and second vertical positions:

when said cylindrical mirror is located at the first position, said cylindrical mirror is located outside an optical path of the optical beam: and when said wedge-shaped prism is located at the second position, said wedge-shaped prism is located within the optical path of the optical beam so as to refract the incident optical beam in a predetermined direction.

* * * * *